United States Patent
Kim

(10) Patent No.: US 8,468,555 B2
(45) Date of Patent: Jun. 18, 2013

(54) TURNTABLE FOR SPINDLE MOTOR AND SPINDLE MOTOR HAVING THE SAME

(75) Inventor: Yongjoo Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 83 days.

(21) Appl. No.: 13/149,219

(22) Filed: May 31, 2011

(65) Prior Publication Data

US 2011/0296448 A1     Dec. 1, 2011

(30) Foreign Application Priority Data

May 31, 2010   (KR) ........................ 10-2010-0051411

(51) Int. Cl.
*G11B 17/03*     (2006.01)

(52) U.S. Cl.
USPC .......................................................... 720/702

(58) Field of Classification Search
USPC .......................................................... 720/702
See application file for complete search history.

(56) References Cited

U.S. PATENT DOCUMENTS

| | | | |
|---|---|---|---|
| 6,333,912 B1 * | 12/2001 | Sohn .............................. | 720/702 |
| 6,477,133 B1 * | 11/2002 | Yoshimura et al. ........... | 720/702 |
| 7,434,240 B2 * | 10/2008 | Yoo et al. ...................... | 720/702 |
| 7,814,506 B2 * | 10/2010 | Kim ............................... | 720/702 |
| 8,166,496 B2 * | 4/2012 | Yoo ............................... | 720/702 |
| 2009/0307717 A1 * | 12/2009 | Yoo ............................... | 720/702 |
| 2011/0119692 A1 * | 5/2011 | Ito et al. ........................ | 720/702 |

* cited by examiner

*Primary Examiner* — Mark Blouin
(74) *Attorney, Agent, or Firm* — Saliwanchik, Lloyd & Eisenschenk

(57) ABSTRACT

A spindle motor having a turntable is disclosed, the spindle motor including: a bearing having a rotation hole; a bearing housing accommodating the bearing; a stator including a core secured at a periphery of the bearing housing and a coil wound on the core; a rotation shaft rotatably coupled to the bearing; a rotor coupled to the rotation shaft and including a magnet facing the core; a turntable body coupled to the rotation shaft and formed with a round groove at a bottom surface facing an upper surface accommodated by a disk; and a turntable including at least one ball accommodated in the round groove, where a rolling frictional coefficient between the turntable and the ball is in the range of 0.12~0.16.

7 Claims, 3 Drawing Sheets

TURNTABLE FOR SPINDLE MOTOR AND SPINDLE MOTOR HAVING THE SAME

CROSS-REFERENCE TO RELATED APPLICATION

This application claims the benefit of Korean Patent Application No. 10-2010-0051411, filed May 31, 2010, which is hereby incorporated by reference in its entirety.

BACKGROUND

The present disclosure relates to a turntable for a spindle motor and a spindle motor having the same.

Generally, a spindle motor is widely used in an optical disk drive (ODD) and a hard disk for rotating a disk at a high speed.

The spindle motor for rotating a disk at a high speed includes a rotation shaft, a bearing rotatably supporting the rotation shaft in a rotational shaft hole, a bearing housing accommodating the bearing, a stator secured at the bearing housing, a rotor coupled to the rotation shaft to rotate in association with the stator and a turntable coupled to the rotation shaft to accommodate a disk.

Recently, an automatic balancing system (ABS) with balls arranged in a round groove is widely employed in which a round groove is formed at a bottom surface of a turntable to reduce vibration of the rotation shaft when a disk is rotated at a high speed that is caused by eccentricity generated in the course of manufacturing of the turntable. The balls arranged in the round groove are positioned precisely opposite to an eccentric portion to reduce the vibration generated by the eccentricity.

However, there is a disadvantage in the balls of the ABS in that the balls roll along the turntable inside the round groove to move to a portion opposite to the eccentric portion, where the balls collide each other if the frictional forces of the balls and the turntable are too small, and if the frictional forces of the balls and the turntable are too great, it takes a long time for the balls to move to an opposite portion of the eccentric portion or the balls cannot precisely move to the opposite portion of the eccentric portion.

BRIEF SUMMARY

The present disclosure is to provide a turntable for spindle motor and a spindle motor having the same configured to reduce data writing error and data reading error during recording data on a disk and reading out the data from the disk by reducing generation of vibration and quickly moving balls of an automatic balancing system (ABS) to an opposite portion from the eccentric portion.

An object of the present disclosure is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present disclosure, there is provided a turntable for spindle motor, comprising: a turntable body formed with a round groove at a bottom surface facing an upper surface accommodated by an optical disk; at least one ball accommodated inside the round groove; and a cover member including a felt contacting the balls to block the round groove, wherein a rolling frictional coefficient between the turntable and the balls is in the range of 0.12~0.16.

In another general aspect of the present disclosure, there is provided a spindle motor having a turntable, the spindle motor comprising: a bearing having a rotation hole; a bearing housing accommodating the bearing; a stator including a core secured at a periphery of the bearing housing and a coil wound on the core; a rotation shaft rotatably coupled to the bearing; a rotor coupled to the rotation shaft and including a magnet facing the core; a turntable body coupled to the rotation shaft and formed with a round groove at a bottom surface facing an upper surface accommodated by a disk; and a turntable including at least one ball accommodated in the round groove, where a rolling frictional coefficient between the turntable and the ball is in the range of 0.12~0.16.

In still another general aspect of the present disclosure, there is provided a spindle motor having a turntable, the spindle motor comprising: a bearing; a bearing housing accommodating the bearing; a stator including a core secured at a periphery of the bearing housing and a coil wound on the core; a rotation shaft rotatably coupled to the bearing; a rotor coupled to the rotation shaft and including a magnet; a turntable body coupled to the rotation shaft and formed with a round groove at a bottom surface facing an upper surface accommodated by a disk; and a turntable including at least one ball accommodated in the round groove, where the turntable is made of industrial/engineering plastic of polyacetal resin or POM (Polyoxymethylene) resin.

Technical problems to be solved by the present disclosure are not restricted to the above-mentioned, and any other technical problems not mentioned so far will be clearly appreciated from the following description by skilled in the art.

DETAILED DESCRIPTION

Figure 1:
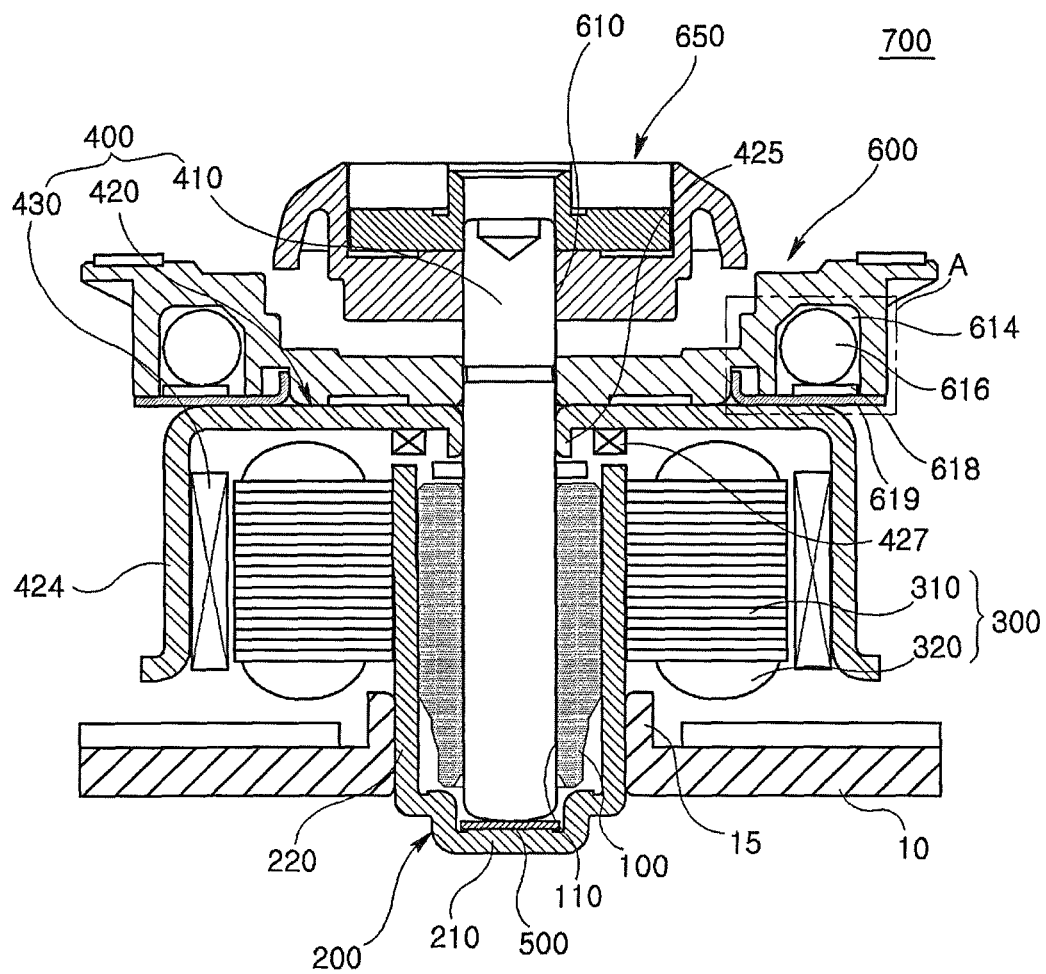
FIG. 1 is a cross-sectional view illustrating configuration of a spindle motor according to an exemplary embodiment of the present disclosure.

An exemplary embodiment of the present disclosure will be described in detail with reference to the accompanying drawings.

Hereinafter, implementations of the present disclosure are described in detail with reference to the accompanying drawings. Detailed descriptions of well-known functions, configurations or constructions are omitted for brevity and clarity so as not to obscure the description of the present disclosure with unnecessary detail. The terminology used herein is for the purpose of describing particular implementations only and is not intended to be limiting of the invention. As used herein, the singular forms "a", "an" and "the" are intended to include the plural forms as well, unless the context clearly indicates otherwise. In the drawings, the size and relative sizes of layers and regions may be exaggerated for clarity. Like numbers refer to like elements throughout.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 2:
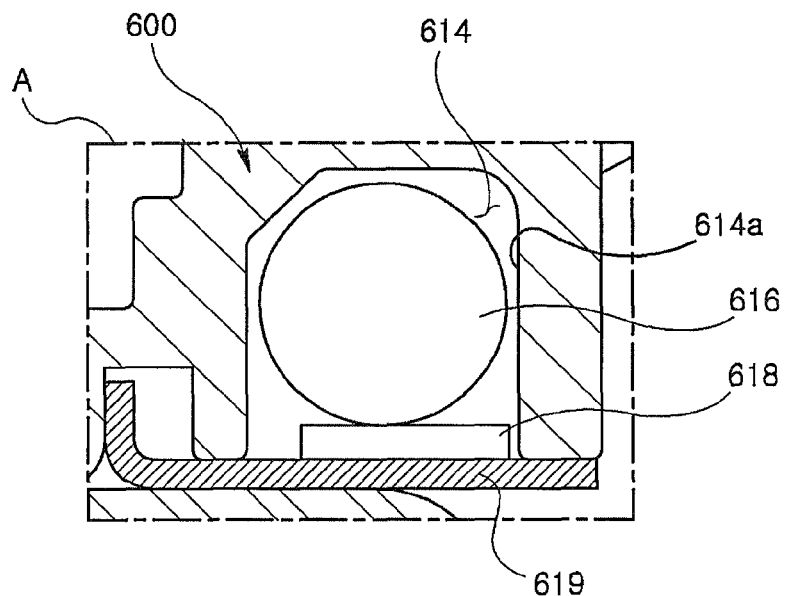
FIG. 2 is an enlarged view of 'A' of FIG. 1.
Figure 3:
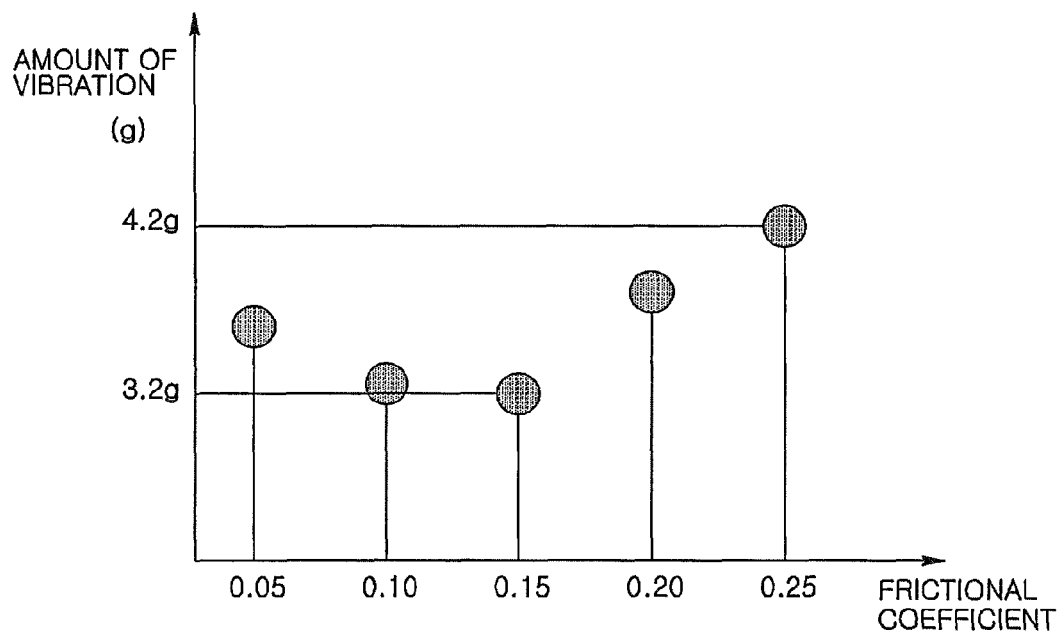
FIG. 3 is a graph illustrating a relationship between frictional coefficient and an amount of vibration of turntable and ball of the spindle motor according to an exemplary embodiment of the present disclosure.

FIG. 1 is a cross-sectional view illustrating configuration of a spindle motor according to an exemplary embodiment of the present disclosure, FIG. 2 is an enlarged view of 'A' of FIG. 1, and FIG. 3 is a graph illustrating a relationship between frictional coefficient and vibration of turntable and ball of the spindle motor according to an exemplary embodiment of the present disclosure.

Referring to FIGS. 1 and 2, a spindle motor (700) includes a bearing (100), a bearing housing (200), a stator (300), a rotor (400) and a turntable (600). The spindle motor (700) may further include a base plate (10) for securing the bearing housing (200), a thrust bearing (500) for reducing noise and friction of the rotor (400) and a center cone (650).

The bearing (100) takes the shape of a cylinder formed with a rotation shaft hole (110). The bearing (100) may include an oil impregnation sintered bearing for rotating the rotor (described later) at a high speed.

The bearing housing (200) takes the shape of an upper end-opened cylinder, and includes a floor plate (210) and a lateral wall (220). The floor plate (210) takes the shape of a disk, for example, and is arranged with a thrust bearing (500). The lateral wall (220) is arranged for storing the bearing (100), and extended from the floor plate (210) along a periphery of the bearing (100).

Therefore, the lateral wall (220) takes the shape of a cylinder and the bearing (100) is inserted into the lateral wall (220) in the present exemplary embodiment. The bearing (100) may be press-fitted into the bearing housing (200) such that the bearing (100) can be inhibited from being rotated by the bearing housing (200).

The stator (300) includes a core (310) and a coil (320). The core (310) is structured with a plurality of stacked iron pieces, each piece having an opening. The core (310) is inserted into a periphery of the bearing housing (200) and secured thereat. The coil (320) uses a winding unit (not shown) formed on the core (310) to be wound on the core (310).

The rotor (400) includes a rotation shaft (410), a yoke (420) and a magnet (430). The rotation shaft (410) is rotatably inserted into the rotation shaft hole (110) of the bearing (100). The rotation shaft (410) is curved at a bottom distal end, for example, to point-contact the thrust bearing (500) arranged on the floor plate (210) of the bearing housing (200).

The yoke (420) includes a disk-shaped yoke upper plate (422) and a yoke skirt portion (424) so bent from the yoke upper plate (422) as to face a lateral surface of the core (310).The yoke upper plate (422) is centrally formed with a yoke burring unit (425) inserted through an upper end of the rotation shaft (410) and press-fitted into the rotation shaft (410). The yoke upper plate (422) is arranged at an inner lateral surface with a suction magnet (427) that operates in association with the bearing (100).

The magnet (430) is arranged at an inner lateral surface of the yoke skirt portion (424). The rotor (400) is rotated at a high speed relative to the stator (300) by magnetic field generated by the magnet (430) and magnetic field generated by the coil (320) wound on the core (310).

The base plate (10) takes the shape of a plate, and is centrally formed with a base burring unit (15) that is press-fitted into the lateral wall (220) of the bearing housing (200).

The turntable (600) is arranged on the yoke upper plate (422) and includes a disk-shaped turntable body. The turntable body of the turntable is centrally formed with a through hole (610) into which the rotation shaft (410) is press-fitted.

A doughnut-shaped round groove (614) is formed at a bottom surface facing an upper surface of the disk-shaped turntable body of the turntable, when viewed from a plane. The round groove (614) takes the shape of trench, has a depth greater than a diameter of a ball (616, described later), and has a width greater than the diameter of the ball (616)

A space formed by the round groove (614) is arranged with at least one ball (616). Preferably, the space formed by the round groove (614) is arranged with a plurality of balls (616).

The ball (616) rolls along an inner lateral surface (614a) of the turntable (600) formed by the round groove (614), as the turntable (600) rotates at a high speed, to be arranged at a portion opposite to a portion where eccentricity is generated in the turntable, whereby the eccentricity of the turntable (600) is compensated by the balls (616).

A cover member (619) is arranged at a bottom surface of the turntable (600) for inhibiting the balls (616) from deviating to the outside of the round groove (614) by blocking the round groove (614). The cover member (619) takes the shape corresponding to that of the round groove (614), when viewed from a plane.

A felt for inhibiting or limiting vibration caused by contact with the balls (616) is arranged at a portion contacting the balls (616) in the cover member (619).

Frictional coefficient between the turntable (600) and the balls (616) is a very important factor in the exemplary embodiment of the present disclosure. If the frictional coefficient between the turntable (600) and the balls (616) is too great, the balls (616) can hardly roll smoothly, and if the frictional coefficient between the turntable (600) and the balls (616) is too small, the balls (616) may contact one another or collide there among to generate unnecessary vibration.

Referring to FIG. 3, if the frictional coefficient between the turntable (600) and the balls (616) is gradually increased from 0.05, 0.10, 0.15, 0.20 to 0.25, the amount of vibration is recorded in the range of 3.2 g (gravity)~4.2 g (gravity), and friction coefficient is in the range of of 0.10~0.15, as a result of measuring the vibration generated between the turntable (600) and the balls (616). To be more specific, the amount of vibration is approximately 3.2 g when the frictional coefficient is 0.12~0.16.

If the frictional coefficient between the turntable (600) and the balls (616) is smaller than 0.12 or greater than 0.16, the amount of vibration tends to increase. For example, if the frictional coefficient between the turntable (600) and the balls (616) is 0.25, vibration of approximately 4.2 g is generated.

In the present exemplary embodiment, if the frictional coefficient between the turntable (600) and the balls (616) is in the range of 0.12~0.16, an approximately 3.2 g of vibration is generated, where almost no data read error or data write error occurs.

Meanwhile, if the frictional coefficient between the turntable (600) and the balls (616) is smaller than 0.12 or greater than 0.16, the amount of vibration increases. For example, if the frictional coefficient between the turntable (600) and the balls (616) is 0.25, an approximately 4.2 g of vibration is generated as illustrated in FIG. 3, where approximately 10% to 20% of data read error and data write error occur, which is a very high level over those of the vibration of 3.2 g. If vibration over 4.2 g is generated, the data read error and data write error further increase in proportion to the vibration.

Therefore, if the frictional coefficient between the turntable (600) and the balls (616) is made to be in the range of approximately 0.12 to approximately 0.16, generation of the data read error and data write error can be completely inhibited and/or restricted.

In order for the frictional coefficient between the turntable (600) and the balls (616) to be made in the range of approximately 0.12 to approximately 0.16 in the present exemplary embodiment, the turntable (600) is made of industrial/engineering plastic of polyacetal resin or POM (Polyoxymethylene) resin.

That is, manufacturing of turntable (600) with polyacetal resin or POM (Polyoxymethylene) resin can cause the frictional coefficient between the turntable (600) and the balls (616) to be in the range of approximately 0.12 to approximately 0.16. At this time, vibration generated between the turntable (600) and the balls (616) may be approximately 3.2 g, whereby generation of the data read error and data write error can be inhibited and/or restricted.

Figure 4:
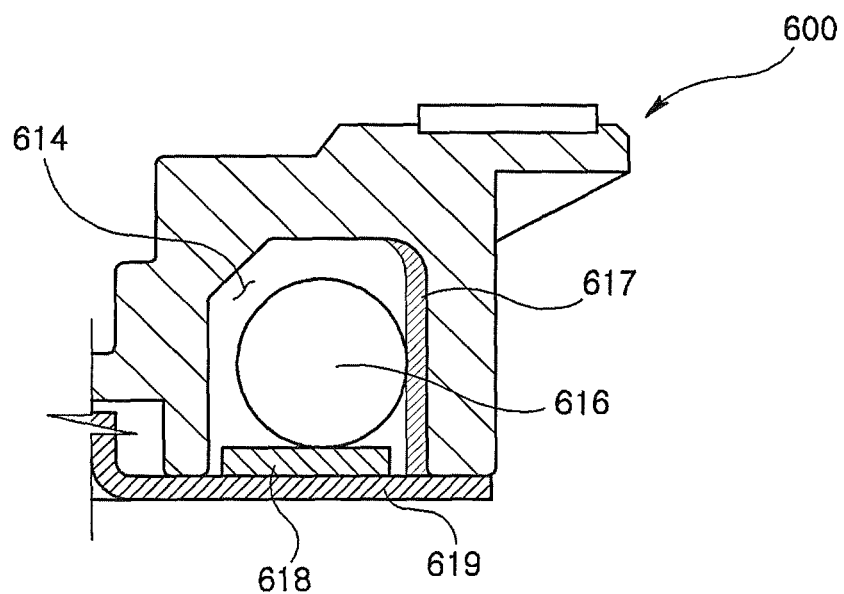
FIG. 4 is a cross-sectional view illustrating configuration of a turntable of a spindle motor according to another exemplary embodiment of the present disclosure.

FIG. 4 is a cross-sectional view illustrating configuration of a turntable of a spindle motor according to another exemplary embodiment of the present disclosure.

Configuration in the spindle motor according to FIG. 4 is substantially identical to that of FIGS. 1 and 3 except for a turntable, such that no redundant explanation and description will be made thereto. Like reference numerals will be provided with like numerals as those in FIGS. 1 and 3.

Referring to FIGS. 1 and 4, a spindle motor (700) includes a bearing (100), a bearing housing (200), a stator (300), a rotor (400) and a turntable (600). The spindle motor (700) may further include a base plate (10) for securing the bearing housing (200), a thrust bearing (500) for reducing noise and friction of the rotor (400) and a center cone (650).

The turntable (600) is arranged on the yoke upper plate (422) of a yoke (420) and takes the shape of a disk. The turntable (600) is centrally formed with a through hole (610) into which the rotation shaft (410) is press-fitted.

A doughnut-shaped round groove (614) is formed at a bottom surface facing an upper surface of the disk-shaped turntable, when viewed from a plane. The round groove (614) takes the shape of trench, has a depth greater than a diameter of a ball (616, described later), and has a width greater than the diameter of the ball (616).

A polyacetal resin membrane or POM (Polyoxymethylene) resin membrane (617) is formed at an inner lateral surface of the turntable (600) formed by the round groove (614) to make a frictional coefficient between the turntable (600) and the balls (616) in the range of approximately 0.12 to approximately 0.16.

To be more specific, the polyacetal resin membrane or POM (Polyoxymethylene) resin membrane (617) may be selectively formed at the inner lateral surface of the turntable contacting the ball (616) to which centrifugal force is applied as the turntable (600) is rotated at a high speed. Meanwhile, the turntable formed with the polyacetal resin membrane or POM (Polyoxymethylene) resin membrane (617) may be formed with other materials than the polyacetal resin or POM (Polyoxymethylene) resin.

Figure 5:
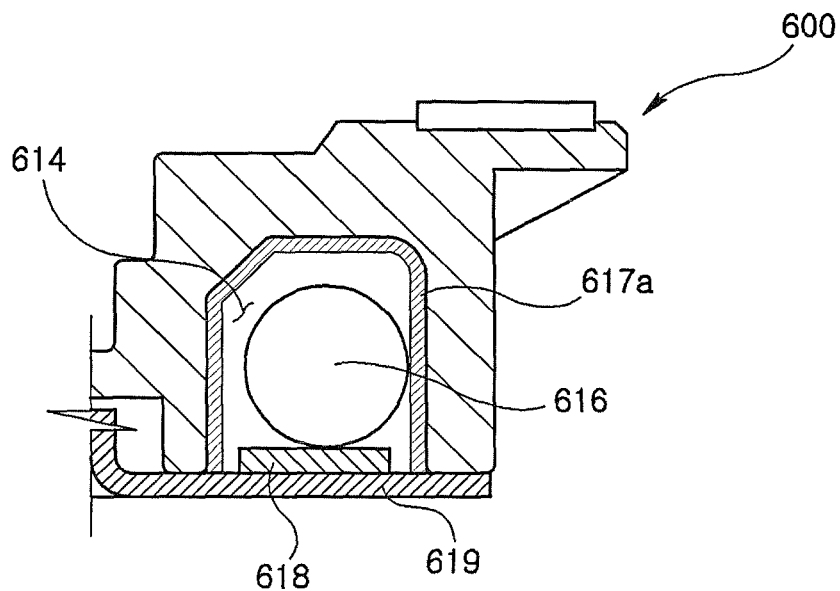
FIG. 5 is a cross-sectional view illustrating configuration of a turntable of a spindle motor according to still another exemplary embodiment of the present disclosure.

FIG. 5 is a cross-sectional view illustrating configuration of a turntable of a spindle motor according to still another exemplary embodiment of the present disclosure.

Configuration in the spindle motor according to FIG. 5 is substantially identical to that of FIG. 4 except for a turntable, such that no redundant explanation and description will be made thereto. Like reference numerals will be provided with like numerals as those in FIG. 4.

Referring to FIGS. 1 and 5, a spindle motor (700) includes a bearing (100), a bearing housing (200), a stator (300), a rotor (400) and a turntable (600). The spindle motor (700) may further include a base plate (10) for securing the bearing housing (200), a thrust bearing (500) for reducing noise and friction of the rotor (400) and a center cone (650).

The turntable (600) is arranged on the yoke upper plate (422) of a yoke (420) and takes the shape of a disk. The turntable (600) is centrally formed with a through hole (610) into which the rotation shaft (410) is press-fitted.

A doughnut-shaped round groove (614) is formed at a bottom surface facing an upper surface of the disk-shaped turntable, when viewed from a plane. The round groove (614) takes the shape of trench, has a depth greater than a diameter of a ball (616, described later), and has a width greater than the diameter of the ball (616).

A polyacetal resin membrane or POM (Polyoxymethylene) resin membrane (617a) is formed at an inner lateral surface of the turntable (600) formed by the round groove (614) to make a frictional coefficient between the turntable (600) and the balls (616) in the range of approximately 0.12 to approximately 0.16.

To be more specific, the polyacetal resin membrane or POM (Polyoxymethylene) resin membrane (617a) may be formed at all the inner lateral surfaces of the turntable formed by the round groove (614).

Meanwhile, the turntable formed with the polyacetal resin membrane or POM (Polyoxymethylene) resin membrane (617a) may be formed with other materials than the polyacetal resin or POM (Polyoxymethylene) resin.

As apparent from the foregoing, there is an industrial applicability in the turntable for spindle motor and the spindle motor having the same in that a frictional coefficient between the turntable and balls embedded in the turntable rotating a disk at a high speed can be adjusted to reduce data writing error and data reading error during recording data on the disk and reading out the data from the disk by reducing generation of vibration as the turntable is rotated at a high speed.

Although the exemplary embodiments of the present disclosure have described that the turntable is formed with polyacetal resin or POM (Polyoxymethylene) resin material, and an inner lateral surface formed by the round groove is partially or entirely formed with polyacetal resin membrane or POM (Polyoxymethylene) resin membrane, it should be apparent that surface of balls arranged in the round groove may be coated with polyacetal resin membrane or POM (Polyoxymethylene) resin membrane to make a frictional coefficient between the turntable and the balls in the range of approximately 0.12 to approximately 0.16.

Although embodiments have been described with reference to a amount of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A turntable for spindle motor, comprising:
a turntable body formed with a round groove at a bottom surface facing an upper surface accommodated by an optical disk; at least one ball accommodated inside the round groove; and
a cover member including a felt contacting the balls to block the round groove,
wherein a rolling frictional coefficient between the turntable and the balls is in the range of 0.1~0.16, wherein an amount of vibration generated between the turntable and the balls is in the range of 3.2 g (gravity) ~4.2 g (gravity), and wherein the turntable is made of industrial/engineering, plastic of polyacetal resin or Polyoxymethylene (POM) resin.

2. The turntable of claim 1, wherein an inner lateral surface of the round groove contacting the balls by rotation of the turntable in inner lateral surfaces formed by the round groove is selectively formed with industrial/engineering plastic of polyacetal resin membrane or POM (Polyoxymethylene) resin membrane.

3. The turntable of claim 1, wherein all the inner lateral surfaces of the turntable formed by the round groove are formed with industrial/engineering plastic of polyacetal resin membrane or POM (Polyoxymethylene) resin membrane.

4. A spindle motor having a turntable, the spindle motor comprising:

a bearing having a rotation hole; a bearing housing accommodating the bearing;

a stator including a core secured at a periphery of the bearing housing and a coil wound on the core; a rotation shaft rotatably coupled to the bearing;

a rotor coupled to the rotation shaft and including a magnet facing the core;

a turntable body coupled to the rotation shaft and formed with a round groove at a bottom surface facing an upper surface accommodated by a disk; and a turntable including at least one ball accommodated in the round groove, where a rolling frictional coefficient between the turntable and the ball is in the range of 0.12~0.16, wherein an amount of vibration generated between the turntable and the ball is in the range of 3.2 g (gravity) ~4.2 g (gravity), and wherein an inner lateral surface of the round groove contacting the ball by rotation of the turntable in inner lateral surfaces formed by the round groove is selectively formed with industrial/engineering plastic of polyacetal resin membrane or polyoxymethylene POM resin membrane.

5. The spindle motor of claim 4, wherein all the inner lateral surfaces of the turntable formed by the round groove are formed with industrial/engineering plastic of polyacetal resin membrane or POM (Polyoxymethylene) resin membrane.

6. The spindle motor of claim 4, further comprising a cover member covering the round groove, and a portion contacting the ball in the cover member is formed with a felt.

7. A spindle motor having a turntable, the spindle motor comprising:

a bearing;

a bearing housing accommodating the bearing;

a stator including a core secured at a periphery of the bearing housing and a coil wound on the core;

a rotation shaft rotatably coupled to the bearing;

a rotor coupled to the rotation shaft and including a magnet;

a turntable body coupled to the rotation shaft and formed with a round groove at a bottom surface facing an upper surface accommodated by a disk; and a turntable including at least one ball accommodated in the round groove, where the turntable is made of industrial/engineering plastic of polyacetal resin or POM (Polyoxymethylene) resin, wherein a rolling frictional coefficient between the turntable and the ball is in the range of 0.12~0.16, and wherein an amount of vibration generated between the turntable and the ball is in the range of 3.2 g (gravity) ~4.2 g (gravity).

* * * * *